May 8, 1956  G. L. ATHERHOLT, SR., ET AL  2,744,756
HYDROSTATIC HOLDING DEVICE
Filed Nov. 1, 1954  2 Sheets-Sheet 2
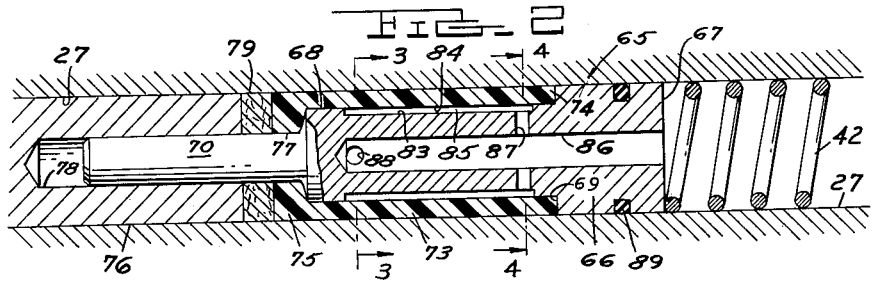
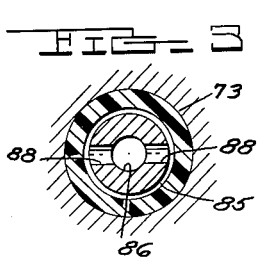
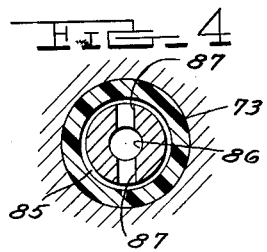
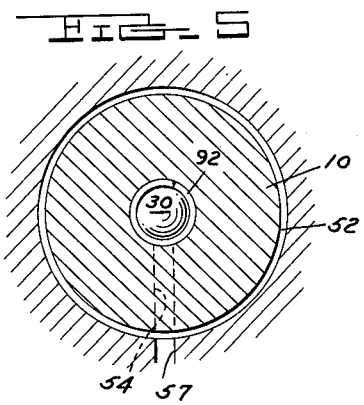
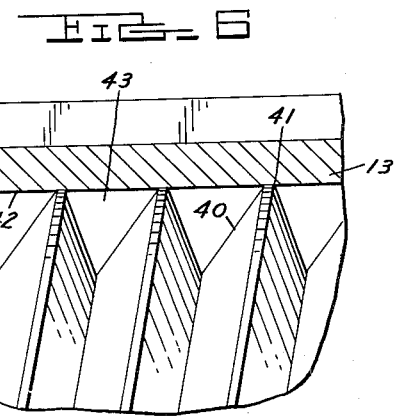
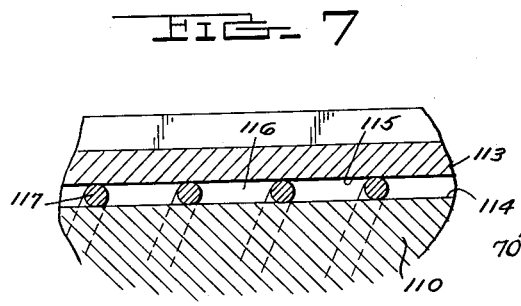
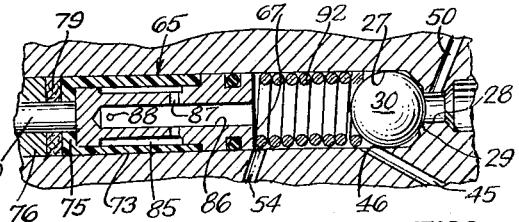
INVENTORS
GEORGE L. ATHERHOLT, SR.
GEORGE L. ATHERHOLT, JR.
BY
Barnes, Kisselle, Laughlin & Raisch
ATTORNEYS United States Patent Office 2,744,756
Patented May 8, 1956

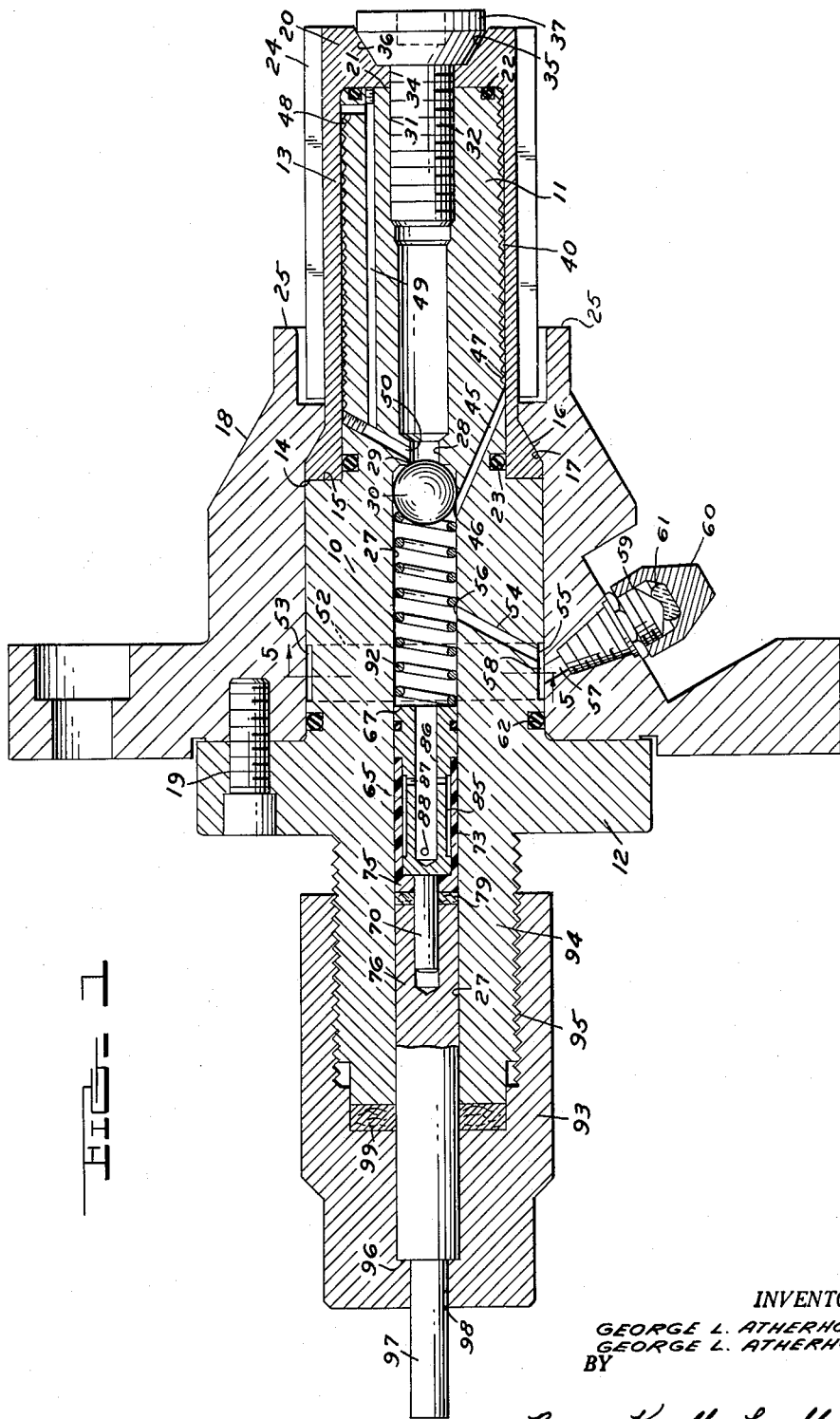

2,744,756

HYDROSTATIC HOLDING DEVICE

George L. Atherholt, Sr., Flint, and George L. Atherholt, Jr., Royal Oak, Mich.

Application November 1, 1954, Serial No. 465,996

21 Claims. (Cl. 279—2)

This invention relates to a hydrostatic holding device and particularly to that type of device which is called an "expanding mandrel" or "chuck" for either external or internal holding units.

Devices of this hydrostatic type are illustrated in the Christman Patent 1,818,042 of August 11, 1931, and the Conradson Patent 2,318,838 of May 11, 1943. Our co-pending application Serial No. 359,886, filed June 5, 1953, relates also to similar devices.

An object of this invention is to provide an expanding mandrel or chuck structure of improved operation and simplicity. In accordance with the invention a pressure forming piston structure is provided which expands under the mandrel pressure to seal the mandrel fluid within the mandrel core or body; a piston return structure is provided which also holds a removable plug in sealed position in the pressure bore of the mandrel body; a helical support structure is provided between the body and the expansible shell for supporting the shell against external forces and the support cooperates with adjacent surfaces to form a helical passageway insuring complete displacement of air in the expansion chamber by the mandrel fluid during filling; the expansible shell is sealed against the body by interengaging taper elements on the shell and on a member secured to the body, the member being adapted to be secured to a machine tool spindle or the like. Other improvements appear in the detailed description.

One form of the invention is shown in the accompanying drawings which may be briefly described as follows:

Fig. 1 is a generally sectional view of a mandrel according to this invention.

Fig. 2 is an enlarged generally sectional view illustrating the structure of the pressure forming piston.

Fig. 3 is a sectional view on line 3—3 of Fig. 2.

Fig. 4 is a sectional view on line 4—4 of Fig. 2.

Fig. 5 is a sectional view on line 5—5 of Fig. 1.

Fig. 6 is an enlarged partly sectional fragmentary view illustrating the helical support and passageway structure in the expansion chamber.

Fig. 7 is an enlarged, partly sectional fragmentary view of a modified form of the helical structure in the expansion chamber.

Fig. 8 is a fragmentary sectional view showing the piston in an advanced position.

The mandrel shown in the drawings has a central body or core 10 with a generally cylindrical end portion 11 and an enlarged portion forming a flange or ring 12. A thin walled, hollow, cylindrical shell 13 is secured in sealed relation over end portion 11 with its inner end 14 abutted against a shoulder 15 on the body by wedging interengagement of a taper portion 16 and a mating taper portion 17 on an adapter ring 18 secured against flange 12 by threaded means such as bolts 19. The outer end portion 20 of the shell forms a cap overlying the axially outer extremity 21 of projection 11 on the mandrel body. O-rings 22 and 23 are interposed between end portion 11 and the outer and inner ends respectively of shell 13. The exterior of shell 13 is adapted for engaging a tool or work piece and may be provided with teeth 24 for that purpose. Projections 25 on ring 18 provide stops for positioning a tool or work piece on the mandrel.

Body 10 has an axial bore 27 with a constricted portion 28 forming a seat 29 for a ball 30 and has an outlet portion 31 threaded to receive an Allen head screw 32. End portion 23 of shell 13 has an opening 34 in registry with bore 27 and has an adjacent taper portion 35 for sealing engagement with a mating taper portion 36 of the head 37 of screw 32.

End portion 11 of core 10 is threaded as at 40 and the outer edges 41 of the threads contact the inner surface 42 of the shell to provide support for the shell against external forces and to define a helical passageway 43 extending generally the length of portion 11 and shell 13. A passageway 45 opens into bore 27 on one side of ball 30 as at 46 and connects the bore with one end 47 of helical passageway 43. The other end 48 of the helical passageway connects into a passageway 49 which opens into the constricted portion 28 of the bore adjacent ball 30 as at 50.

Body 10 has an annular recess 52 cooperating with the inner surface of adapter ring 18 to form an annular passageway 53. Body 10 has an inlet passageway 54 with one end 55 opening into the recess and its other end 56 opening into bore 27. Adapter ring 18 has a passageway 57 whose inner end 58 registers with recess 53 and whose outer end is provided with a fitting 59 such as an alemite fitting for filling the mandrel with a substantially incompressible fluid such as a zircon grease. The fitting has a cap 60 thereon. A seal element 61 is preferably secured in sealing engagement over the outer orifice of fitting 59 as illustrated in Fig. 1. An O-ring 62 is provided for sealing the fluid in annular passageway 53.

A pressure forming piston 65 in bore 27 has a metal body 66 with a forward end or head portion 67 engaging the walls of the bore. The rearward portion of the piston body is cut away to form a smaller cylindrical surface 68 and an annular shoulder 69. A rod portion 70 projects rearwardly from the piston body. A cylindrical sleeve 73 fits over portion 68 with its forward edge 74 abutted against shoulder 69 and with its rear portion 75 formed inwardly to provide a cushion for receiving thrust from an actuating element 76.

Cushion 75 and actuating element 76 have central apertures 77 and 78, respectively, for receiving rod 70 as shown. A washer 79 preferably made of leather is interposed between the cushion and actuating element. Sleeve 73 is made of a tough, form retaining but somewhat flexible material such as nylon. The exterior portions of sleeve 73 and head 67 of the piston body form a substantially continuous surface as shown.

Piston body 66 has a generally central annular recessed portion 83 spaced from the interior surface 84 of sleeve 73 to form an expansion chamber 85. The piston body has a central passageway 86 which opens at its forward end into bore 27 and which communicates into expansion chamber 85 through ports 87 and 88. The ports are preferably disposed at right angles to each other and are positioned adjacent the ends of chamber 85 to provide for complete displacement of the air in the piston structure when it is filled with the mandrel fluid. An O-ring 89 is provided in the head portion of the piston.

A compressed coil spring 92 in bore 27 seats on the forward end portion 67 of piston 65 and reacts against ball 30 to secure the ball in sealing relation against its seat 29. The spring is arranged so that when it is compressed to solid condition by piston 65, the forward end 67 of the piston is adjacent opening 56 of inlet passageway 54 as shown in Fig. 8.

The pressure creating assembly is contained within bore 27 by a cap 93 threaded onto an extension 94 of body 10 as at 95, the cap and actuating element 76 having interengaging shoulder portions as illustrated at 96 in Fig. 1. The end portion 97 of the actuating element projects through an opening 98 in the cap as shown for connection to suitable manual or powdered operating mechanism (not shown). A gasket 99 is preferably interposed between the cap and the end of the mandrel body.

As to use of the mandrel, it may be assumed initially that the mandrel is empty. To fill the mandrel with fluid, screw 32 is removed from the end 31 of bore 27; cap 60 and seal 61 are removed from fitting 59 and piston 65 is advanced by shifting actuating element or plunger 76 until forward end 67 of the piston is adjacent opening 56 of inlet passage 54. Mandrel fluid is introduced into bore 27 through fitting 59, annular chamber 53 and inlet passage 54.

Ball 30 forms an obstruction in bore 27 so that the fluid is forced through passageway 45 into the upstream end 47 of helical passageway 43. The fluid then advances through the helical passageway to its downstream end 48 and then into passageway 49, constriction 28 and outlet portion 31 of the bore. The fluid also fills piston chamber 85 through passageway 86 and ports 87 and 88. Inner end 56 of the inlet passageway is immediately adjacent the forward end 67 of piston 65, inner ends 46 and 50 of passageways 45 and 49, respectively, are immediately adjacent ball 30 and ports 87 and 88 are adjacent the ends of chamber 85, thereby eliminating pockets in which air might be trapped in filling the mandrel.

When the mandrel has been filled, cap 60 and seal element 61 are secured on fitting 59 and screw 32 is threaded into outlet portion 31 to seal the fluid within bore 27. Piston 65 is retracted as screw 32 is advanced into the bore. Cap 93 may then be rotated on the mandrel body to shift actuating element 76 and thereby adjust the axial position of the piston. The piston position may be adjusted subsequently from time to time as use of the mandrel may require.

The mandrel is mounted for use by bolting adapter ring 18 on the spindle of a machine tool or the like. A tool or work piece to be held by the mandrel is positioned on shell 13 and against stops 25. Actuating element 76 is then shifted to the right as Fig. 1 is viewed, advancing piston 65, compressing spring 92 and creating pressure in bore 27 which is transmitted through passageway 86 and ports 87 and 88 to chamber 85, thereby expanding sleeve 73 into tight sealing engagement with the walls of bore 27. At the same time the pressure is transmitted to the helical expansion chamber defined by threads 40 and shell 13, thereby expanding the shell into firm holding engagement with the tool or work piece thereon. To release the tool or work piece, actuating element 76 is shifted to the left and piston 65 is returned under action of spring 92, thereby relieving the pressure in the system and allowing shell 13 to contract resiliently for disengagement from the tool or work piece which may then be removed.

The elimination of pockets in the pressure system and the helical chamber structure facilitate substantially complete displacement of air in the system by the mandrel fluid upon filling so that pressures sufficient for expanding shell 13 are produced by relatively small movements of piston 65. The resilient leather washer 79 serves to prevent wear at the corners of cushion 75, especially during advancing movements of the piston.

The axially outward thrust on shell 13 resulting from the pressure in the system tends to wedge inner end 14 of the shell into tighter engagement with the mandrel body, thereby improving the seal between the shell and the body. The bolted and wedge seal features of the mandrel provides a simple yet strong and durable construction. During filling and operation of the mandrel, spring 92 serves as a return for piston 65 and serves to secure ball 30 in sealed position against its seat 29.

To disassemble the pressure creating assembly, cap 93 is removed, actuating element 96 withdrawn from bore 27 and with screw 32 removed, the piston, spring and ball may be forced out of the bore such as by pushing on ball 30 with a rod inserted through end portion 31 of the bore. To replace the assembly, the ball, spring and piston are merely inserted into the bore through end portion 94 of the mandrel body and cap 93 replaced. Shell 13 may be removed merely by removing bolts 19 and adapter ring 18 and sliding the shell off of end portion 11. The shell is replaced by the reverse process. Ring 18 may have any convenient rotative position on body 10 since the end 58 of passage 57 will open into chamber 53 in any circumferential position.

The modified form of the invention shown in Fig. 7 is similar to the principal form except that mandrel body 110 and shell 113 have spaced apart cylindrical surfaces 114 and 115 respectively forming a cylindrical expansion chamber 116. A separate helical element such as a spring 117 is disposed within the expansion chamber to provide a helical passageway therein and to provide internal support for shell 113. Operation of the modified form is similar to operation of the principal form as described.

We claim:

1. A hydrostatic mandrel comprising, a body, a relatively thin walled hollow shell, means securing said shell in overlying relation on said body, said shell having exposed portions adapted to engage a tool, means forming a generally helical passageway between said body and shell, the sides of said passageway being defined at least in part by portions of said body and shell, said body having a chamber, means in said body forming an inlet for introducing a generally incompressible fluid into said chamber, means in said body forming an outlet for the fluid, duct means in said body, said duct means cooperating with said inlet, chamber, helical passageway and outlet to form a continuous passageway system, whereby fluid introduced into said inlet completely fills said system, means closing said inlet and outlet, and pressure forming means in said chamber, whereby to expand said shell for holding engagement with a tool.

2. A hydrostatic mandrel comprising, a generally solid body having a cylindrical portion, a shell having a relatively thin walled hollow cylindrical portion, means securing said portion of the shell in overlying relation on said portion of the body, said portions being axially generally coextensive, said shell having exposed portions adapted to engage a tool, means forming a generally helical passageway between said body and shell, said passageway being axially generally coextensive with said portions, the sides of said passageway being defined at least in part by said portions of said body and shell, said body having a chamber, means in said body forming an inlet for introducing a generally incompressible fluid into said chamber, means in said body forming an outlet for the fluid, duct means in said body, said duct means cooperating with said inlet, chamber, helical passageway and outlet to form a continuous passageway system, whereby fluid introduced into said inlet completely fills said system, means closing said inlet and outlet, and pressure forming means in said chamber, whereby to expand said shell for holding engagement with a tool.

3. A hydrostatic mandrel comprising, a generally solid body having a generally cylindrical portion, a shell having a relatively thin walled hollow generally cylindrical portion, means securing said portion of the shell in overlying relation on said portion of the body, said portions being axially generally coextensive, said shell having exposed portions adapted to engage a tool, means forming a support disposed between said portions for supporting said shell against external forces, said support having generally helical form and defining a generally helical passageway between said portions, said passageway being axially generally coextensive with said portions, said body having a chamber, means in said body forming an inlet for introducing a generally incompressible fluid into said chamber, means in said body forming an outlet for the fluid, duct means in said body, said duct means cooperating with said inlet chamber, helical passageway and outlet to form a continuous passageway system, whereby fluid introduced into said inlet completely fills said system, means closing said inlet and outlet, and pressure forming means in said chamber, whereby to expand said shell for holding engagement with a tool.

4. A hydrostatic mandrel comprising, a generally solid body having a generally cylindrical portion, a shell having a relatively thin walled hollow generally cylindrical portion, means securing said portion of the shell in overlying relation on said portion of the body, said portions being axially generally coextensive, said shell having exposed regions adapted to engage a tool, one of said portions being threaded, the threads thereon contacting the other of said portions to form a support for supporting said shell against external forces, said threads cooperating with said other portion to define a generally helical passageway between said portions, said body having a chamber, means in said body forming an inlet for introducing a generally incompressible fluid into said chamber, means in said body forming an outlet for the fluid, duct means in said body, said duct means cooperating with said inlet, chamber, helical passageway and outlet to form a continuous passageway system, whereby fluid introduced into said inlet completely fills said system, means closing said inlet and outlet, and pressure forming means in said chamber, whereby to expand said shell for holding engagement with a tool.

5. A hydrostatic mandrel comprising, a generally solid body having a cylindrical portion, a shell having a relatively thin walled hollow cylindrical portion, means securing said portion of the shell in overlying relation on said portion of the body, said portions being axially generally coextensive, said shell having exposed regions adapted to engage a tool, said portions being spaced apart to form a generally cylindrical closure, a generally helical element within said closure, said element being generally axially coextensive with said portions, said element normally contacting both of said portions for supporting said shell against external forces, said element cooperating with said portions to define a generally helical passageway, said body having a chamber, means in said body forming an inlet for introducing a generally incompressible fluid into said chamber, means in said body forming an outlet for the fluid, duct means in said body, said duct means cooperating with said inlet, chamber, helical passageway and outlet to form a continuous passageway system, whereby fluid introduced into said inlet completely fills said system, means closing said inlet and outlet, and pressure forming means in said chamber, whereby to expand said shell for holding engagement with a tool.

6. A hydrostatic mandrel comprising, a generally solid body having a cylindrical portion, a shell having a relatively thin walled hollow cylindrical portion, means securing said portion of the shell in overlying relation on said portion of the body, said portions being axially generally coextensive, said shell having exposed regions adapted to engage a tool, said portion of the shell being recessed to form with said portion of the body a generally cylindrical closure, a generally helical element within said closure, said element being generally axially coextensive with said portions, said element normally contacting both of said portions for supporting said shell against external forces, said element cooperating with said portions to define a generally helical passageway, said body having a chamber, means in said body forming an inlet for introducing a generally incompressible fluid into said chamber, means in said body forming an outlet for the fluid, duct means in said body, said duct means cooperating with said inlet, chamber, helical passageway and outlet to form a continuous passageway system, whereby fluid introduced into said inlet completely fills said system, means closing said inlet and outlet, and pressure forming means in said chamber, whereby to expand said shell for holding engagement with a tool.

7. A hydrostatic mandrel comprising, a body, a relatively thin walled hollow shell, means securing said shell in overlying relation on said body, said shell having exposed portions adapted to engage a tool, means forming a generally helical passageway between said body and shell, the sides of said passageway being defined at least in part by portions of said body and shell, said body having a bore, means in said body forming an inlet for introducing a generally incompressible fluid into said bore, means forming an obstruction in said bore, pressure forming means in said bore on one side of said obstruction, the other side of said bore forming an outlet for the fluid, duct means in said body connecting the ends of said passageway with said bore on opposite sides of said obstruction to form a continuous passageway system, whereby fluid introduced into said inlet completely fills said system, and means closing said inlet and outlet, whereby to expand said shell for holding engagement with a tool upon actuation of said pressure forming means.

8. A hydrostatic mandrel comprising, a body, a relatively thin walled hollow shell, means securing said shell in overlying relation on said body, said shell having exposed portions adapted to engage a tool, means forming a generally helical passageway between said body and shell, the sides of said passageway being defined at least in part by portions of said body and shell, said body having an axial bore, means in said body forming an inlet for introducing a generally incompressible fluid into said bore, means forming a removable obstruction in said bore, a piston in said bore on one side of said obstruction, spring means holding said removable obstruction in position, said spring means reacting against said piston, the other side of said bore forming an outlet for the fluid, duct means in said body connecting the ends of said passageway with said bore on opposite sides of said obstruction to form a continuous passageway system, whereby fluid introduced into said inlet completely fills said system, and means closing said inlet and outlet, said piston being advanceable toward said obstruction for creating pressure in said system, whereby to expand said shell for holding engagement with a tool, said piston being returned by said spring for relieving the pressure in said system and releasing said shell from the tool.

9. The device defined in claim 8 wherein said removable obstruction comprises a ball with a portion of said bore forming a seat therefor, said spring urging said ball into engagement with said seat.

10. The device defined in claim 8 wherein said duct means communicate into said bore immediately adjacent said obstruction and said inlet communicates into said bore immediately adjacent the farthest point of advance of said piston, whereby to substantially completely exclude air from said system upon filling thereof with fluid.

11. A hydrostatic mandrel comprising, a core, a relatively thin walled hollow shell, means securing said shell in overlying relation on said core, said shell having exposed portions adapted to engage a tool, means forming a chamber between said core and shell, said core having a bore, means interconnecting said bore and chamber to form a continuous system, means for filling said system with a substantially incompressible fluid, a piston in said bore, said piston being advanceable and retractable to create and relieve pressure in said system, whereby to expand said shell for holding a tool and to release the tool, said piston having a body, an expansible element overlying said body, means forming a passageway in said body, said passageway opening into said bore and opening adjacent the inner side of said element, whereby pressure created by advancing said piston expands said element to seal the fluid within said bore.

12. A mandrel of the hydrostatic type having a core with an expansible shell thereon, said core having a bore therein, a piston in said bore, said piston being advanceable in said bore to create pressure for expanding said shell, said piston having a body, an element overlying at least a portion of said body, means forming a passageway in said body, said passageway communicating into said bore and opening adjacent the inner side of said element, whereby pressure created by advancing said piston forces said element outwardly to seal fluid within said bore.

13. A mandrel of the hydrostatic type having a core with an expansible shell thereon, said core having a bore therein, a piston in said bore, said piston being advanceable in said bore to create pressure for expanding said shell, said piston having a body, an expansible sleeve overlying a portion of said body, said portion being spaced from the advanced end of said piston, means forming a passageway in said body, said passageway communicating into said bore and opening adjacent the inner side of said sleeve, whereby pressure created by advancing said piston expands said sleeve to seal fluid within said bore.

14. A mandrel of the hydrostatic type having a core with an expansible shell thereon, said core having a cylindrical bore therein, a piston in said bore, said piston being advanceable in said bore to create pressure for expanding said shell, said piston having a cylindrical body, said body having an annular cut away portion spaced from the advance end thereof, an expansible sleeve overlying said cut away portion, the exterior portions of said body and sleeve forming a generally continuous surface, means forming a cylindrical chamber between said cut away portion and said sleeve, means forming a passageway in said body, said passageway communicating into said bore and said chamber, whereby pressure created by advancing said piston expands said sleeve to seal fluid within said bore.

15. A mandrel of the hydrostatic type having a core with an expansible shell thereon, said core having a cylindrical bore therein, a piston in said bore, actuating means in said bore operable to advance said piston to create pressure for expanding said shell, said piston having a cylindrical body, said body having an annular cut away portion spaced from the advance end thereof, an expansible sleeve overlying said cut away portion, the exterior portions of said body and sleeve forming a generally continuous surface, said sleeve having a cushion portion positioned for engagement by said actuating means, means forming a cylindrical chamber between said recessed portion and said sleeve, means forming a passageway in said body, said passageway communicating into said bore and said chamber, whereby pressure created by advancing said piston expands said sleeve to seal fluid within said bore.

16. A mandrel of the hydrostatic type having a core with an expansible shell thereon, said core having a cylindrical bore therein, a piston in said bore, actuating means in said bore operable to advance said piston to create pressure for expanding said shell, said piston having a cylindrical body, said body having an annular enlargement at its forward end, an expansible sleeve overlying said body and abutting against said enlargement, said sleeve having a radially inwardly extending cushion portion overlying the other end of said body for engagement by said actuating means, the exterior portions of said enlargement and sleeve forming a generally continuous surface, means forming a cylindrical chamber between said body and said sleeve, means forming a passageway in said body, said passageway communicating into said bore and said chamber, whereby pressure created by advancing said piston expands said sleeve to seal fluid within said bore.

17. A mandrel of the hydrostatic type having a core with an expansible shell thereon, said core having a cylindrical bore therein, a piston in said bore, actuating means in said bore operable to advance said piston to create pressure for expanding said shell, said piston having a cylindrical body, said body having an annular enlargement at its forward end and having a recessed portion spaced therefrom, an expansible sleeve overlying said recessed portion to form a chamber and abutting against said enlargement, said sleeve having a cap portion overlying the other end of said body for receiving thrust from said actuating means, the exterior portions of said sleeve and enlargement forming a generally continuous surface, said body having a passageway opening at its forward end into said bore, a plurality of ports interconnecting said passageway and chamber, whereby pressure created by advancing said piston expands said sleeve to seal fluid within said bore.

18. The device defined in claim 17 wherein said sleeve is formed of a tough, generally flexible material such as nylon.

19. The device defined in claim 18 wherein a leather washer is interposed between said cap portion and said actuating means.

20. A hydrostatic mandrel comprising, a generally cylindrical body, a relatively thin walled generally cylindrical hollow shell, said shell being disposed in overlying relation on said body, means forming between said body and shell a chamber adapted to be filled with a substantially incompressible fluid, said shell having an exterior axially tapering portion, an element having a taper portion, threaded means securing said element on said body with said taper portions in wedging engagement for sealing said shell against said body, and means in said body operable to create pressure in said fluid for expanding said shell to hold a tool.

21. A hydrostatic mandrel comprising, a generally cylindrical body, a relatively thin walled generally cylindrical hollow shell, an element adapted to be mounted on a machine tool spindle, said shell being disposed in overlying relation on said body, means forming between said body and shell a chamber adapted to be filled with a substantially incompressible fluid, means forming an inlet passageway in said body for admitting the fluid to said chamber, said body having an annular recessed portion, said element overlying said recessed portion to form an annular closure, one end of said passageway opening into said closure, said shell and said element having axially tapering portions, axially extending threaded means securing said element on said body with said tapering portions in wedging engagement for sealing said shell against said body, said element having a passageway registering with said closure, said element having a fitting at the outer end of the passageway therein, said fitting being adapted to pass fluid into said closure and to contain fluid therein, and means in said body operable to create pressure in said fluid for expanding said shell to hold a tool.

References Cited in the file of this patent

UNITED STATES PATENTS

| 1,818,042 | Christman | Aug. 11, 1931 |
| 2,318,838 | Conradson | May 11, 1943 |